United States Patent
Yamashita

(10) Patent No.: US 6,377,904 B1
(45) Date of Patent: Apr. 23, 2002

(54) WELDING LASER FOCAL POINT POSITION DETECTING APPARATUS

(75) Inventor: Toshihisa Yamashita, Shizuoka (JP)

(73) Assignee: Suzuki Motor Corporation, Hamamatsu (JP)

( * ) Notice: Subject to any disclaimer, the term of this patent is extended or adjusted under 35 U.S.C. 154(b) by 0 days.

(21) Appl. No.: 09/321,878

(22) Filed: May 28, 1999

(30) Foreign Application Priority Data

Jun. 3, 1998 (JP) .......................................... 10-170567

(51) Int. Cl.$^7$ .............................................. B23K 26/00
(52) U.S. Cl. ........................... 702/150; 702/85; 702/94; 702/127; 702/150; 219/121.63; 219/121.83
(58) Field of Search ................................ 702/127, 150, 702/85, 94; 700/166; 356/121, 123, 173, 176, 177; 73/866, 866.3; 250/227, 226, 372; 209/111.6; 228/103, 105; 219/121.63, 121.64, 121.83, 121.6, 121.76, 121.77, 121.84, 74, 61; 29/454

(56) References Cited

U.S. PATENT DOCUMENTS

| | | | | |
|---|---|---|---|---|
| 3,993,899 A | * | 11/1976 | Chapman ..................... | 250/227 |
| 4,446,354 A | * | 5/1984 | Kearney ................ | 219/130.01 |
| 4,996,409 A | * | 2/1991 | Paton et al. ........... | 219/130.01 |
| 5,091,627 A | * | 2/1992 | Kimura ................. | 219/121.83 |
| 5,179,261 A | | 1/1993 | Perrotti | |
| 5,187,346 A | | 2/1993 | Bilge et al. | |
| 5,268,556 A | * | 12/1993 | Coyle, Jr. et al. ....... | 219/121.76 |
| 5,272,312 A | * | 12/1993 | Jurca ..................... | 219/121.83 |
| 5,360,960 A | * | 11/1994 | Shirk ..................... | 219/121.83 |
| 5,408,482 A | * | 4/1995 | Nagano et al. ................ | 372/31 |
| 5,446,257 A | | 8/1995 | Sakamoto et al. ..... | 219/121.63 |
| 5,486,677 A | * | 1/1996 | Maischner et al. .... | 219/121.83 |
| 5,607,605 A | | 3/1997 | Musasa et al. | |
| 5,618,452 A | * | 4/1997 | Matubara et al. ...... | 219/121.63 |
| 5,651,903 A | * | 7/1997 | Shirk ..................... | 219/121.64 |
| 5,681,490 A | * | 10/1997 | Chang ................... | 219/121.64 |
| 5,726,418 A | * | 3/1998 | Duthoo .................. | 219/121.63 |
| 5,767,480 A | * | 6/1998 | Anglin et al. .......... | 219/121.69 |
| 5,831,239 A | * | 11/1998 | Matubara et al. ...... | 219/121.64 |

(List continued on next page.)

FOREIGN PATENT DOCUMENTS

| | | |
|---|---|---|
| DE | 195 16 376 A1 | 5/1995 |
| JP | 4-127983 | 4/1992 |
| JP | 0557719 A1 * | 1/1993 |
| JP | 07-016 779 A | 1/1995 |
| JP | 8-281456 | 10/1996 |

OTHER PUBLICATIONS

Maede, et al, "Effects of Assist Gas", Analysis of Keyhole Phenomenon in Laser Welding (Pept.5), pp. 310–311.
Schuberth, et al. "Focal Position Control Circuit for Laser Beam Welding using Adaptive Optics", 1995, pp. 366–367.
English Translation/German Office Action dated Aug. 16, 2001.

Primary Examiner—Marc S. Hoff
Assistant Examiner—Carol S W Tsai
(74) Attorney, Agent, or Firm—McGinn & Gibb, PLLC

(57) ABSTRACT

The present invention provides a welding laser focal point position detecting apparatus capable of directly detecting a welding laser focal point independently of the position of a converging means for converging a welding laser beam. The apparatus comprises: a photo element 5 for receiving plasma light 4 caused at a welding position by a laser beam; a sampler 6 for sampling the photo-electrically converted output from the photo element; variance value calculator 7 for calculating a variance value Var of the discrete light intensity values obtained by the sampler; a focal point table 8 which specifies laser focal points corresponding to the variance value Var; and a focal point calculator for referencing the focal point table 8 so as to convert the light intensity data obtained by the variance value calculator 7, into a welding laser focal point position P for output.

7 Claims, 11 Drawing Sheets

U.S. PATENT DOCUMENTS

| | | | | |
|---|---|---|---|---|
| 5,925,268 A | * | 7/1999 | Britnell | 219/121.63 |
| 5,948,293 A | * | 9/1999 | Somers et al. | 219/121.85 |
| 5,961,858 A | * | 10/1999 | Britnell | 219/121.63 |
| 5,961,859 A | * | 10/1999 | Chou et al. | 219/121.63 |
| 5,968,376 A | * | 10/1999 | Shirk | 219/109 |
| 6,040,550 A | * | 3/2000 | Chang | 219/121.63 |
| 6,057,523 A | * | 5/2000 | Fujii et al. | 219/110 |
| 6,060,685 A | * | 5/2000 | Chou et al. | 219/121.83 |
| 6,075,220 A | * | 6/2000 | Essien et al. | 219/121.63 |
| 6,084,223 A | * | 7/2000 | Dietz et al. | 219/617 |
| 6,151,109 A | * | 11/2000 | Bromssen et al. | 356/121 |
| 6,188,041 B1 | * | 2/2001 | Kim et al. | 219/121.63 |
| 6,204,469 B1 | * | 3/2001 | Fields, Jr. et al. | 219/121.6 |

* cited by examiner

WELDING LASER FOCAL POINT POSITION DETECTING APPARATUS

BACKGROUND OF THE INVENTION

1. Field of the Invention

The present invention relates to a welding laser focal point position detecting apparatus and in particular, to a laser focal point position detecting apparatus for use when welding metal plates.

2. Description of the Related Art

Conventionally, a laser is applied to a welding position on two metal plates placed one on the other, so that the two metal plates at that position are melted and attached to each other. Especially, this laser welding is used for welding a sheet steel. The welding quality depends on a deviation amount from an optimal position of the laser focal point. For obtaining a preferable welding, it is necessary to control the focal point to be at an optimal position.

In a conventional laser welding apparatus, a distance between a laser converging means or parabolic reflector and a plate to be welded is detected, and the position of the converting means is controlled, so that the distance is constant. Thus, the position of the laser focal point position is corrected. This configuration is disclosed in Japanese Patent Application A4-127983.

In this example, however, the laser focal point position is corrected, assuming that the distance from the converging means to the laser focal point is constant. (That is, the laser focal point position is not directly detected.) Accordingly, if the distance between the converging means and the laser focal point is changed due to deterioration with age of an optical system and laser, it becomes impossible to correct the focal point to be at its optimal position.

Moreover, U.S. Pat. No. 5,607,605 discloses a technique to photograph a plasma with a CCD camera and calculates a plasma image-occupied ratio in the picture photographed. However, in this example, the relationship between the plasma image-occupied ratio and the focal distance is not monotonous increase or decrease, and it is impossible to decide whether it is nearer or farther from the optimal focal point position.

SUMMARY OF THE INVENTION

It is therefore an object of the present invention to provide a welding laser focal point position detecting apparatus capable of directly detecting a welding laser focal point independently of the position of the converging means for converging laser.

Moreover, the present invention detects the focal point at real time, so that the focal point is always at its optimal position.

Furthermore, the present invention enables to detect the focal point at a very small interval smaller than one second so that a focal point position change can be detected immediately.

In order to attain the aforementioned, the inventor of the present invention performed an experiment as follows. An aluminum plate was placed on another aluminum plate and a laser beam (carbon dioxide laser) was applied to a welding position. Thus, melting state was checked. This check was repeated while changing the converging means of reflector or lens in a direction of the laser beam and the position of the converging means which gave the maximum melting was made to be a reference position of the laser focal point. The converging means has parabolic reflector or converging lens.

Here, the distance between the converging means and the laser focal point is constant if no change with age is considered for the optical system. Next, a photo element was fixed at a predetermined distance from the melting position to receive the plasma light emission from the welding position. Outputs of the photo element was sampled periodically for a predetermined time interval and the light intensity data items thus obtained were used to calculate a variance value.

The converging means was positioned so that the laser focus was at the reference position. Furthermore, the position of the converging means was successively shifted by 1 mm so that the laser focal point was displaced by 1 mm each time. Variance values were calculated for the range of minus 2 to plus 3 mm with respect to the reference position. This resulted in the graph shown in FIG. 4. The horizontal axis represents a laser focal point position assuming 0 for the reference position. The vertical axis represents variance values.

From this experiment, it has been found that in a predetermined range (minus 2 to plus 2 mm), there is one-to-one relationship between the variance value and the focal point. Utilizing this relationship, the inventor found a method to determine a focal point position from a variance.

The apparatus according to the present invention comprises: a photo element for receiving light from a position of welding performed by a laser beam source and converting the intensity of the received light into an electric signal; a sampler for sampling periodically the electric signal produced from the photo element, periodically with a predetermined interval; and a calculator for calculator for calculating a data distribution (deviation from a reference value) or variance of discrete light intensity data items when a predetermined number of light intensity data items have been stored.

The apparatus may further comprise: a focal point table which specifies a laser focal point position corresponding to a variance; and a focal point position calculation means for referencing the variance of focal point table obtained by the calculator, so as to convert the variance of the light intensity data into a welding laser focal point position for output.

Moreover, the inventor used an average value of the light intensity data in addition to the variance. That is, a characteristic amount of the variance divided by a square of the average value. As a result, it was found that the characteristic amount and the focal point position was in the relationship shown in FIG. 6.

This FIG. 6 shows a wider range (minus 2 to plus 3 mm) of one-to-one correspondence between the vertical axis as the characteristic amount and the horizontal axis of the focal point position in comparison to the relationship between the variance value and the focal point position Accordingly, if a focal point position is derived from the aforementioned characteristic amount, it is possible to detect a focal point position in a wider range than when using the correspondence between the variance and the focal point position.

The welding laser focal point position detecting apparatus according to the present invention comprises: a photo element for receiving light from a position of welding performed by a laser beam source and converting the intensity of the received light into an electric signal; a sampler for sampling periodically the electric signal produced from the photo element, periodically with a predetermined interval; and variance value calculation means for calculating a variance value of discrete light intensity data obtained by the sampler.

Moreover, the apparatus according to the present invention may comprise: an average value calculation means for calculating an average value of the discrete light intensity data obtained by the sampler; a characteristic amount calculation means for calculating a characteristic amount of a variance divided by a square of the average value; and a focal point table for specifying a laser focal point according to the characteristic amount.

Furthermore, the apparatus may comprise a focal point position calculation means for referencing the focal point table so as to convert the characteristic amount obtained by the characteristic amount calculation means, into a welding laser focal point for output.

DESCRIPTION OF THE PREFERRED EMBODIMENTS

Description will now be directed to preferred embodiments of the present invention with reference to the attached drawings.

Embodiment 1

Figure 1:
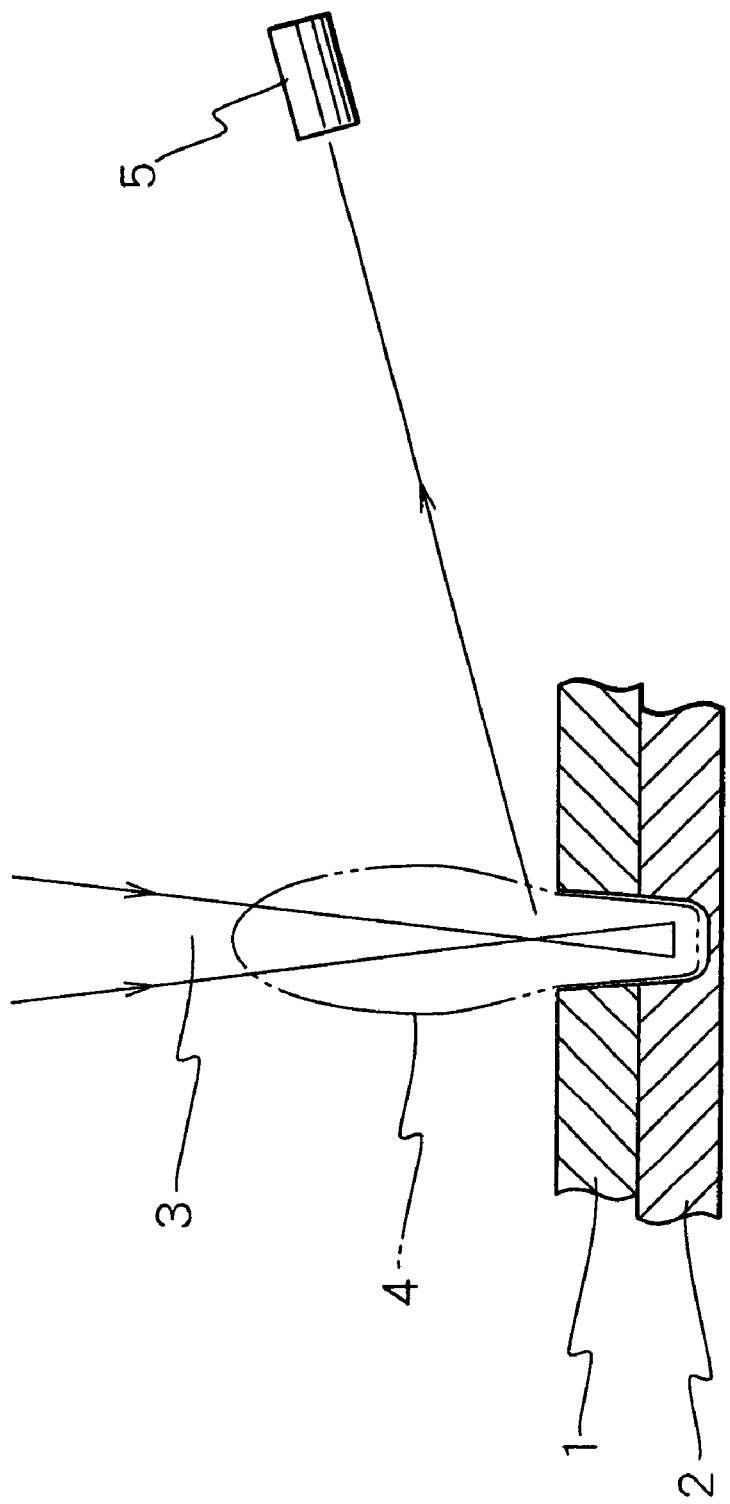
FIG. 1 shows a plasma at a welding position and a photo-element at its fixed position.

As shown in FIG. 1, a first metal sheet 1 is placed on a second metal sheet 2 and a laser 3 is applied to a welding position, where plasma 4 is caused. This plasma is detected by a photo-element 5.

Figure 2:
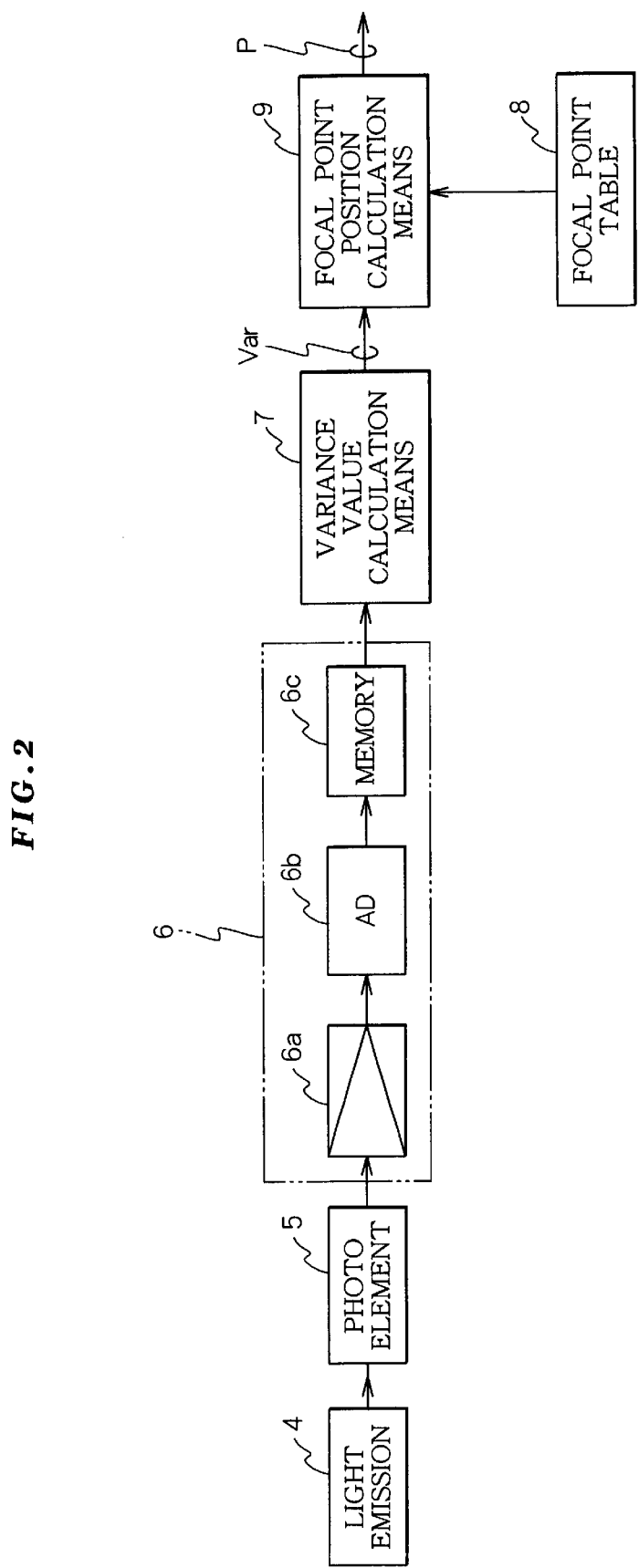
FIG. 2 is a block diagram showing a configuration of a first embodiment of the present invention.

FIG. 2 is a block diagram showing a focal point position detecting apparatus according to a first embodiment of the present invention. This focal point position detecting apparatus comprises: a photo-element for detecting the plasma 4 caused at the welding position by the laser 3; a sampler 6 for sampling a photo-electrically converted output of the photo-element 5; and a variance calculation means for calculating the variance value Var based on discrete light intensity data obtained by the sampler 6.

The apparatus further comprises: a focal point table 8 having focal points of the laser 3 specified corresponding to the variance values; and focal point position calculation means 9 for converting the variance value Var of the light intensity data obtained by the variance value calculation means 7, into a welding laser focal point position P.

The photo-element may be, for example, a photo diode, which is fixed to a position capable of detecting the plasma 4 from the welding position.

The sampler includes: an amplifier 6a for producing an amplified voltage signal according to the output of the photo element 5; an A/D converter 6b for periodically sampling a continuous analog signal from the amplifier 6a, into a discrete light intensity data; and a memory 6c for storing the output from the A/D converter 6b.

The variance value calculation means 7 calculates a variance value Var of the light intensity data which has been stored up to a predetermined amount. Here, the variance value Var is calculated according to Equation 1 as follows:

$$\mathrm{Var}(x_1 \ldots x_N) = \frac{1}{N-1} \sum_{j=1}^{N} (x_j - Ave)^2 \quad \text{[Equation 1]}$$

wherein N represents a sampling count, xj is a j-th light intensity data item, Ave is an average value of x1 to xN.

Figure 4:
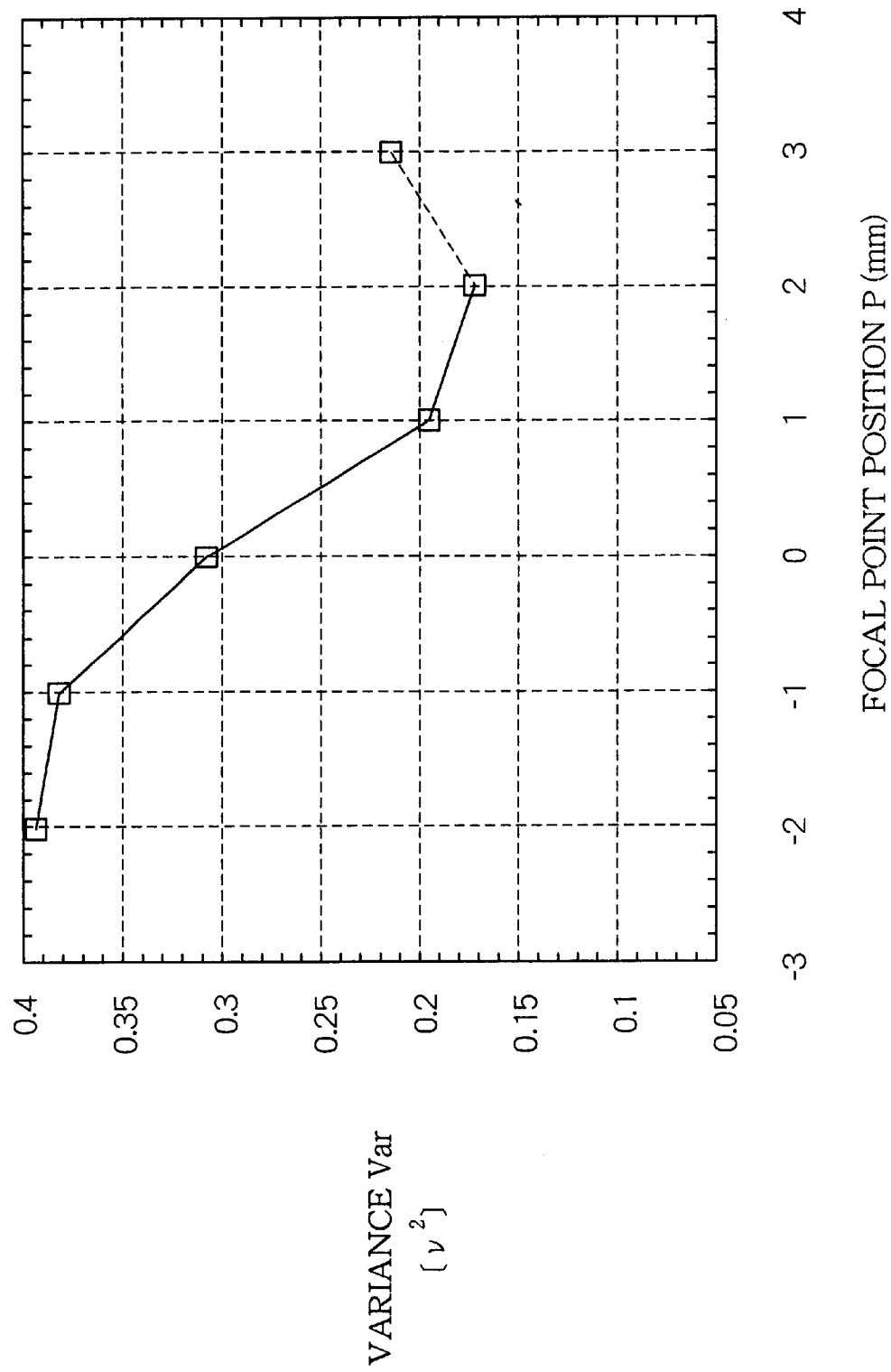
FIG. 4 shows an example of a focal point table obtained by the second embodiment shown in FIG. 3.

The focal point table 8 is prepared by measuring the relationship between the aforementioned variance value and the focal point without changing the positional relationship between the fixed position of the photo element 5 and the welding position. FIG. 4 shows an example of the focal point table 8, wherein the variance value Var is gradually increased while the focal point P moves toward the inside of the metal plate (minus side) and the variance value Var is gradually decreased while the focal point moves toward outside (plus side) (within a range of −2 mm to +2 mm). This relationship (the range of −2 mm to +2 mm) experimentally obtained is recorded in the focal point table.

The focal point position calculation means 9 receives a variance value Var produced periodically from the variance value calculation means 9 and, referencing the focal point table 8, converts the variance value Var into a corresponding focal point position P (deviation from a reference position) for output.

For example, when 0.35 (unit is a square of v) is output as a variance value Var from the variance value output means, the focal point P is calculated as about − (minus) 0.5 mm; and when 0.25 is output as a variance value Var, the focal point P is calculated to be about + (plus) 0.5 mm.

Thus, it has been found that the variance value of the light intensity at a welding position and the focal point position are in one-to-one relationship, and this relationship is recorded on the focal point table. By utilizing this focal point table 8, the focal point position is obtained from the variance value Var. Thus, the focal point of the welding laser can be detected according to the output of the photo element 5. Consequently, even if the distance between the converging means and the laser focal point is changed due to a change with age in the laser optical system or the oscillator. Thus, even if the laser optical system and the oscillator have changed their states with age, which in turn fluctuates the distance between the laser converging means and the laser focal point, the focal point position can be detected only based on the light intensity from the welding position, thus enabling to correctly detect the focal point position.

Here, the sampler 6, the variance value calculation means 7, and the focal point position calculation means 9 may be realized by executing a focal point detecting program by a computer. In this case, the focal point detecting program may be read out from a medium which can be read by the computer. This medium contains a sampling program for sampling a photo-electrically converted output from the photo element; a variance value calculation program for calculating a variance value of the discrete light intensity data obtained by the sampling processing; and a focal point position calculation program for referencing the focal point table so as to convert the discrete light intensity data obtained in the discrete value calculation processing, into a welding laser focal point position for output.

Figure 3:
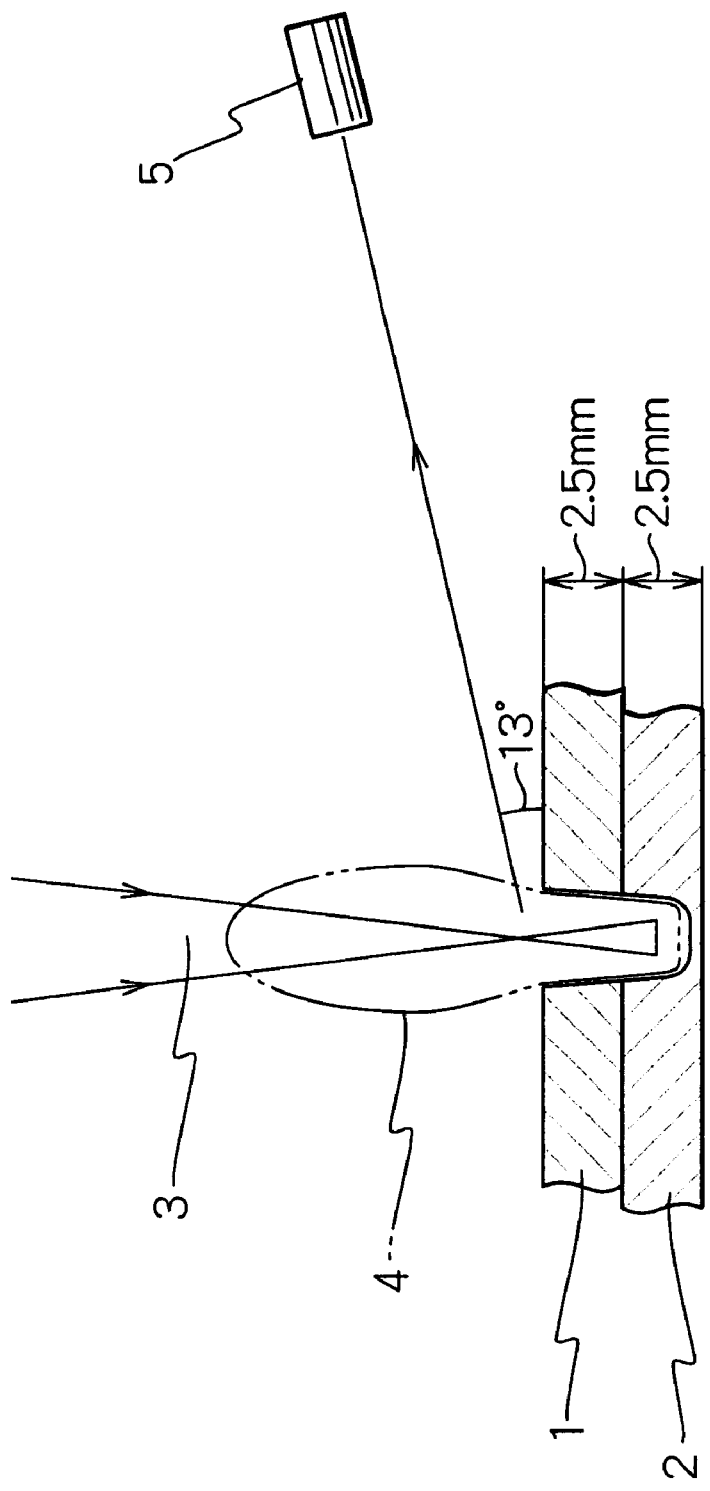
FIG. 3 is for explaining the example of the first embodiment of the present invention shown in FIG. 2.

Next, referring to FIG. 2 to FIG. 4, explanation will be given more specifically for setting a focal point table 8.

In order to set the focal point table 8, following preparations were performed. As shown in FIG. 3, an aluminum plate 1 of JIS A5083 was placed on another aluminum plate 2 of JIS A5083, each having a thickness of 2.5 mm, and a photo element 5 was fixed at a position of 13 degrees with respect to the surface of the aluminum plate 1. The photo element 5 was arranged with its receiving surface toward the welding position. The welding laser used was a carbon dioxide gas laser 3 of 3 kW output (feed speed 3 m/s, filler supply speed 3 m/s). Then welding was begun and the plasma light emission 4 was obtained. The carbon dioxide laser is emitted from a tip end of a nozzle (torch) which moves up and down together with the converging means. Actually, the welding operation was repeated, and a laser focal point reference position was decided by the nozzle tip end position (laser focal point position at that moment) when the maximum welding of the aluminum plate was obtained.

The carbon dioxide laser 3 was emitted when the nozzle tip end was at the reference position, and a variance value Var obtained from the variance value calculation means 7 via the photo element 5 and the sampler 6 was recorded.

Next, the nozzle position was successively shifted by 1 mm at each time from the reference position. Each time the nozzle position was shifted, a variance value Var was recorded. Here, the sampling rate was set to 20 kHz and the number of samples was set to 10000.

As a result, the relationship shown in FIG. 4 was obtained. In this FIG. 4, the focal point position P is negative when the laser focal point is shifted inward of the aluminum plates and positive when the laser focal point is shifted outward from the aluminum plates.

The correspondence of range from −2 mm to +2 mm where the change ratio did not change sign was set in the focal point table 8.

Embodiment 2

Figure 5:
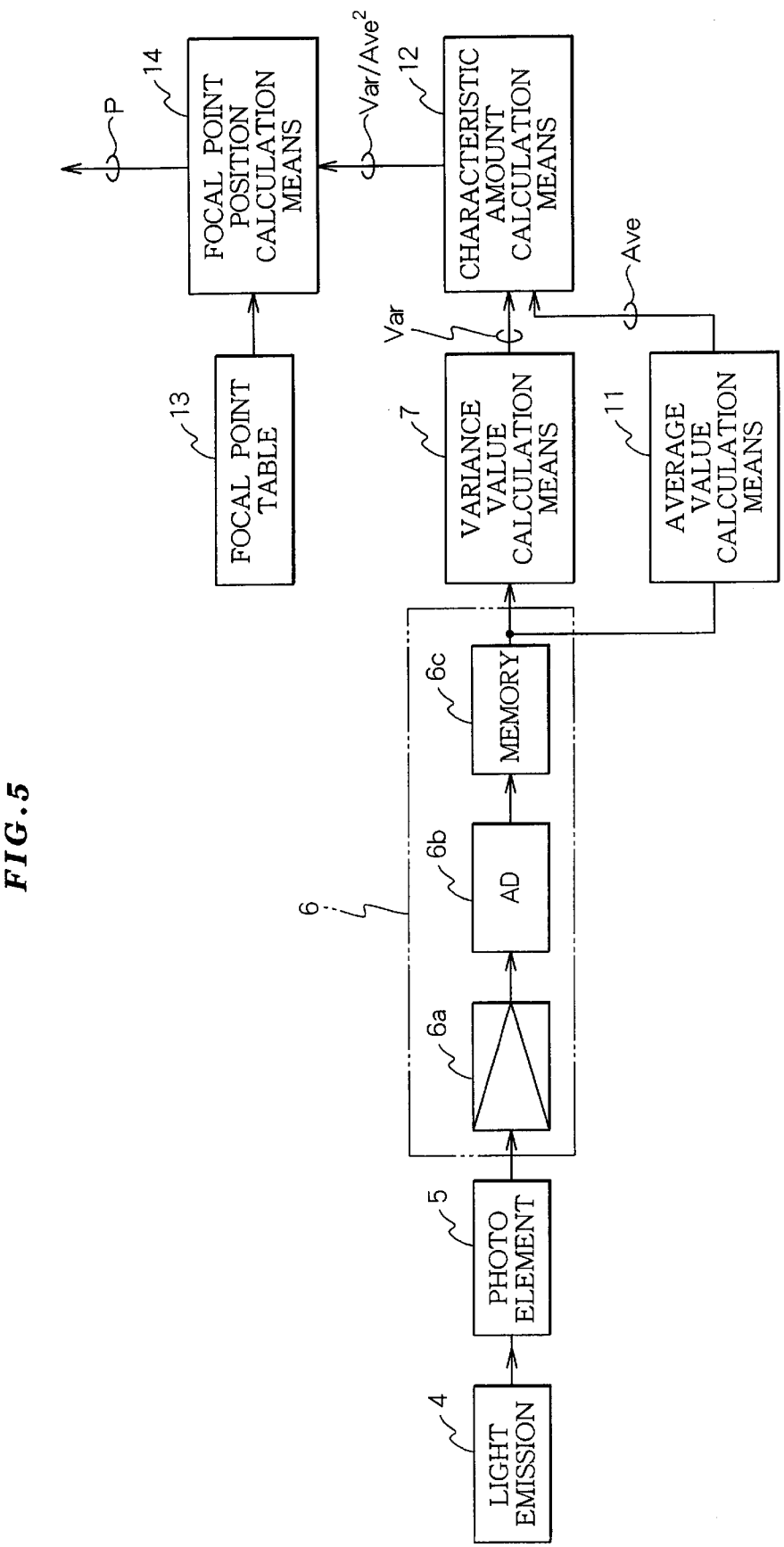
FIG. 5 is a block diagram showing a configuration of a second embodiment.
Figure 6:
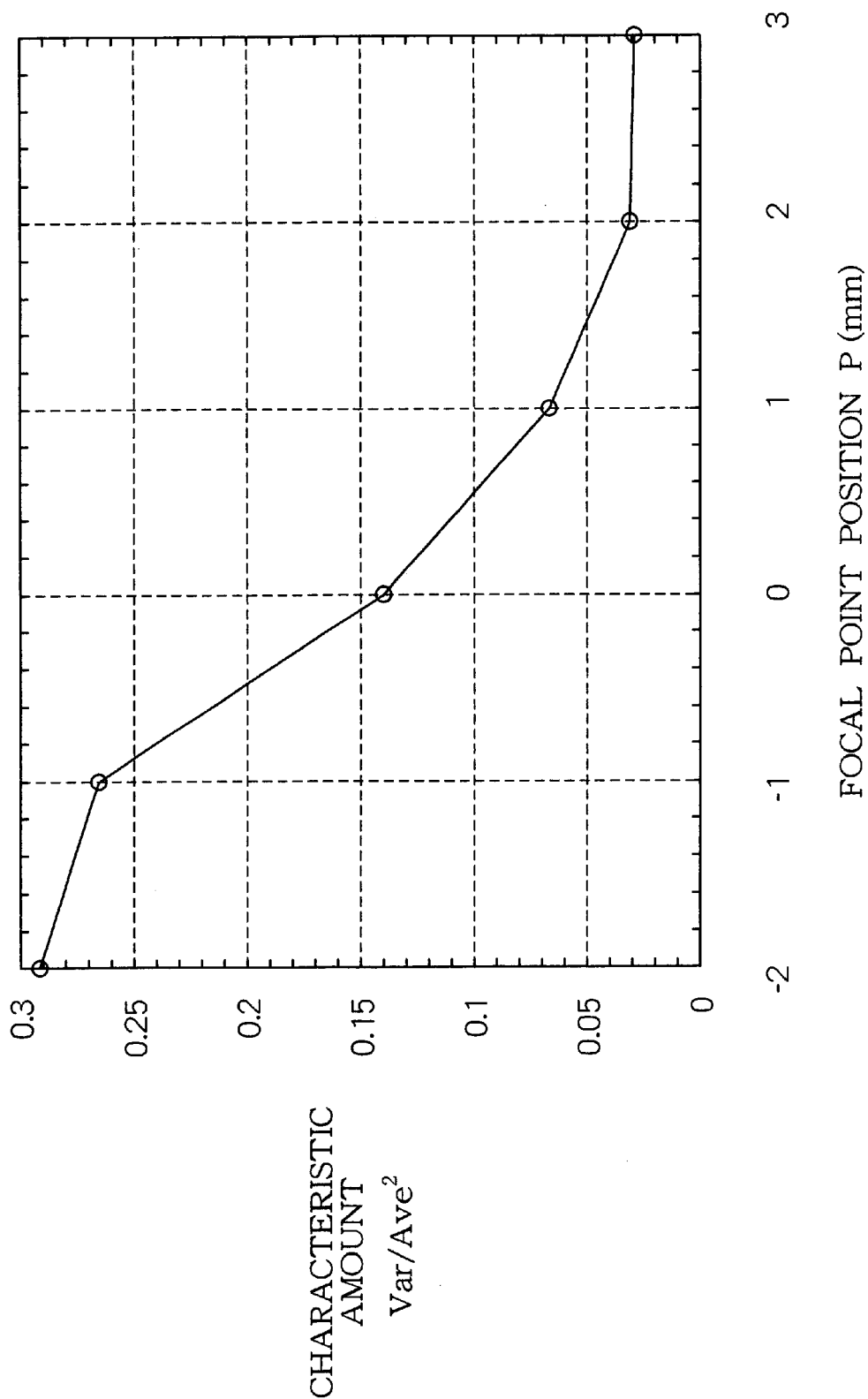
FIG. 6 is an example of a focal point table obtained by the second embodiment shown in FIG. 5.

Description will now be directed to a second embodiment of the present invention with reference to FIG. 5 and FIG. 6.

The welding laser focal point position detecting apparatus shown in FIG. 5 comprises: a photo element 5 for receiving plasma light emission from a welding position by the laser 3; a sampler 6 for sampling the photo-electrically converted output from the photo element; and a variance value calculation means 7 for calculating a variance value Var of the discrete light intensity data obtained by the sampler 6.

Moreover, the apparatus comprises: an average value calculation means 11 for calculating an average value Ave of the discrete light intensity data obtained by the sampler 6; and a characteristic amount calculation means for calculating a characteristic amount obtained by the variance Var divided by a square of Ave.

Furthermore, the apparatus comprises: a focal point table 13 specifying a focal point of the laser 3 corresponding to a characteristic amount; and a focal point position calculation means 14 fore referencing the focal point table 13 to convert the characteristic amount obtained by the characteristic amount calculation means 12, into a welding laser focal point position P for output.

In this embodiment, the photo element 5, the sampler 6, and the variance value calculation means 7 identical configurations as in the first embodiment. The average value calculation means 11 calculates an average value Ave of the light intensity data for use in a variance value Var calculation by the variance value calculation means 7. The calculation of the average value Ave is performed according to Equation 2 as follows:

$$AVe = \frac{1}{N}\sum_{j=1}^{N} x_j \qquad \text{[Equation 2]}$$

wherein N represents a number of sampled items, and xj is a j-th light intensity data item.

As for the focal point table 13, the relationship between the aforementioned characteristic amount and the focal point is measured beforehand and recorded, without changing the positional relationship between the fixed position of the photo element 5 and the welding position.

FIG. 6 is a focal point table 13 containing outputs from the characteristic amount calculation means 12 under the same conditions as the first embodiment. Assuming that the focal point causing the maximum welding as a reference point (point 0), the characteristic amount is gradually increased when the focal point position P is shifted inward (minus side) of the metal sheets and the characteristic amount is gradually decreased when the focal point position P is shifted outward (plus side).

The focal point position calculation means 14 receives a characteristic amount produced periodically from the characteristic amount calculation means 12 and references the focal point table 13 so as to convert the characteristic amount into a corresponding focal point position P (deviation from the reference position) for output.

According to this embodiment, in addition to the aforementioned effects of the first embodiment, it is possible to increase the valid range of the focal point table because the variance value is divided by a square of the average value. Thus, it is possible to detect a focal point in a wider valid range.

Here, the sampler 6, the variance value calculation means 7, the average value calculation means, the characteristic amount calculation means 12, and the focal point position calculation means 9 may be realized by execution of a focal point detection program by a computer. In this case, the focal point detection program may be read out from a medium readable by the computer. This medium contains a program to be executed by the computer, the program including the sampling processing 6 for sampling a photo-electrically converted output from the photo element 5; the variance value calculation processing for calculating a variance value var of the discrete light intensity data obtained by this sampling processing 6; the characteristic amount calculation processing for dividing the variance value by a square of the average value Ave so as to obtain a characteristic amount; and the focal point calculation processing for referencing the focal point table 13 and converting the characteristic amount obtained in the characteristic amount calculation processing, into a focal point of the welding laser 3.

Moreover, in the block diagram of FIG. 5, the average value Ave produced from the average value calculation means 11 may also be used for calculation of the variance value by the variance value calculation means 7.

Embodiment 3

Figure 7:
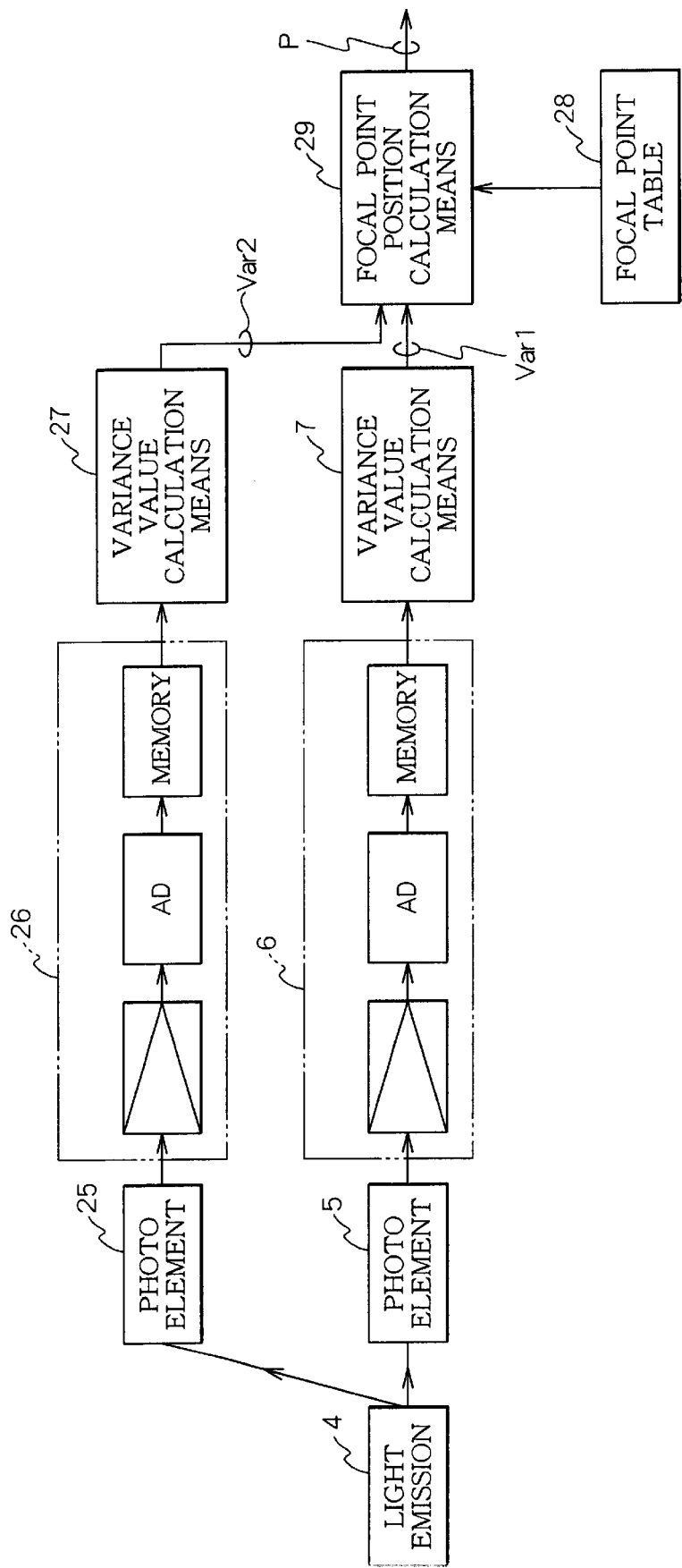
FIG. 7 is a block diagram showing a configuration of a third embodiment of the present invention.

Description will now be directed to a third embodiment shown in a block diagram of FIG. 7.

In addition to the components shown in FIG. 1, there are provided a second photo element 25, a second sampler 26, and a second variance value calculation means. The second photo element 25 is fixed at a position different from the first photo element 5.

As for the focal point table 28, in addition to the relationship between the variance value and the focal point obtained by the first photo element 5, a relationship between a variance value and a focal point obtained according to the output from the second photo element is also recorded.

The focal point position calculation means 29 reference the focal point table 28 and calculates a focal point position P according to the two outputs from the two variance value calculation means.

With the aforementioned configuration, it is possible to obtain the same effects as the first embodiment.

Embodiment 4

Figure 8:
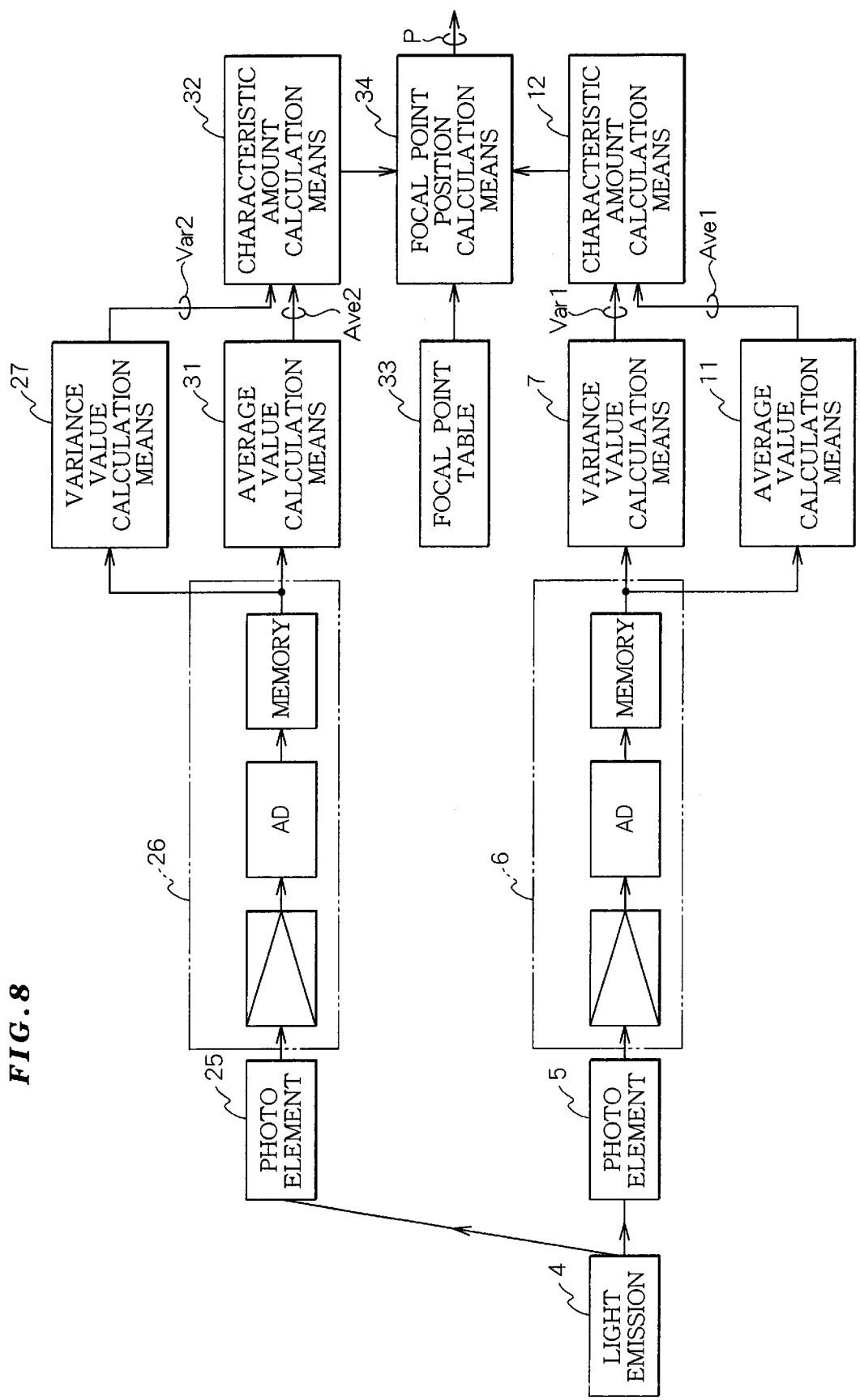
FIG. 8 is a block diagram showing a configuration of a fourth embodiment of the present invention.

FIG. 8 is a block diagram showing a configuration of the fourth embodiment of the present invention. In addition to the configuration of the first embodiment shown in FIG. 1, the fourth embodiment comprises: a second photo element 25, a second sampler 26, a second variance value calculation means 27, a second average value calculation means 31, and a second characteristic amount calculation means 32.

The second photo element 25 is fixed at a position different from the position of the first photo element 5. As for the focal point table 33, in addition to the relationship between the characteristic amount and a focal point obtained according to the output from the first photo element 5, the relationship between a characteristic amount and a focal point obtained according to an output from the second photo element 25 is also recorded. The focal point calculation means 34 references the focal point table 33 and calculates a focal point P according to the two output items from the two characteristic amount calculation means 12 and 32.

With this configuration, it is possible to obtain the same effects as the second embodiment.

Figure 9:
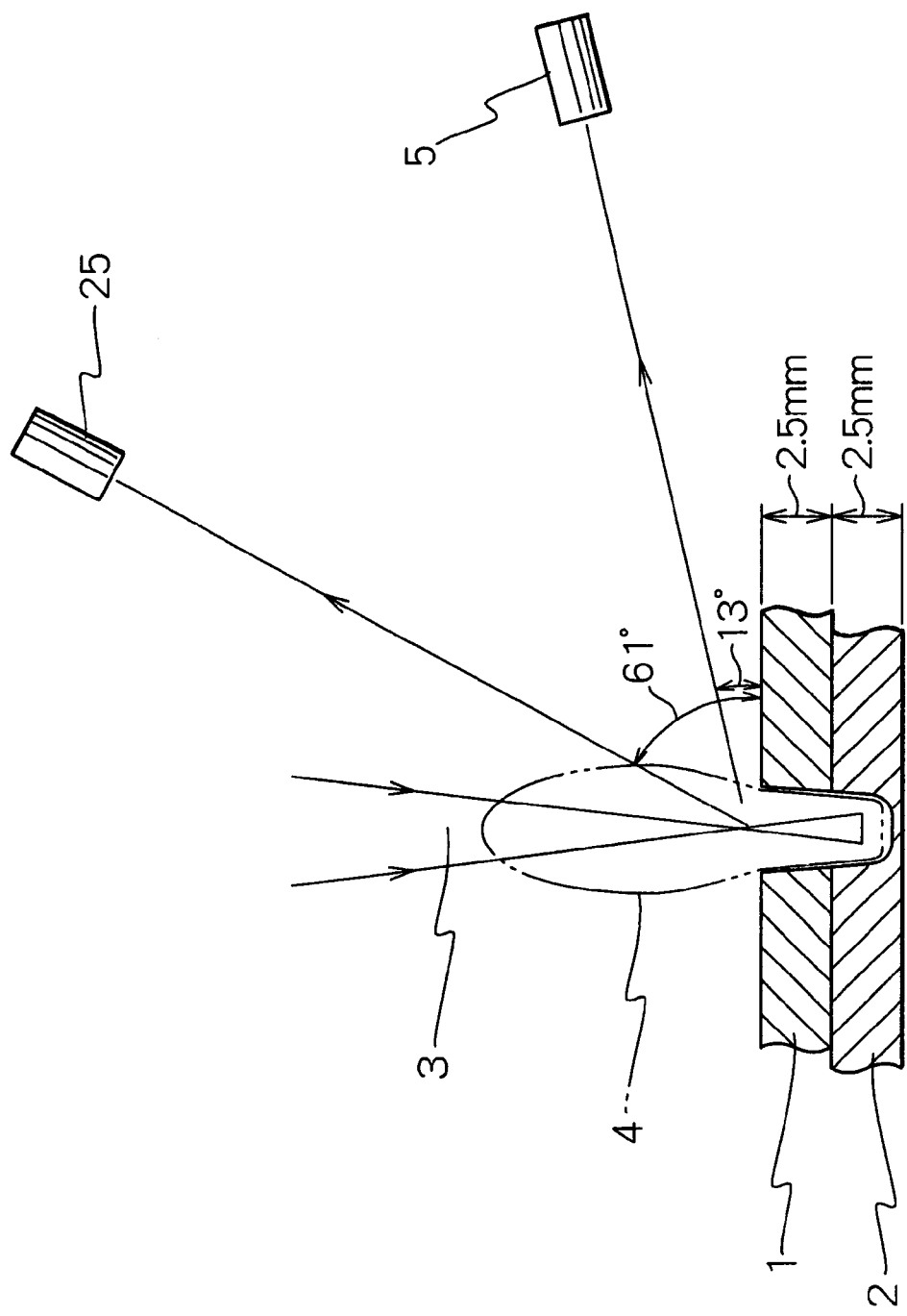
FIG. 9 is for explaining an example according to the fourth embodiment of FIG. 8.
Figure 10:
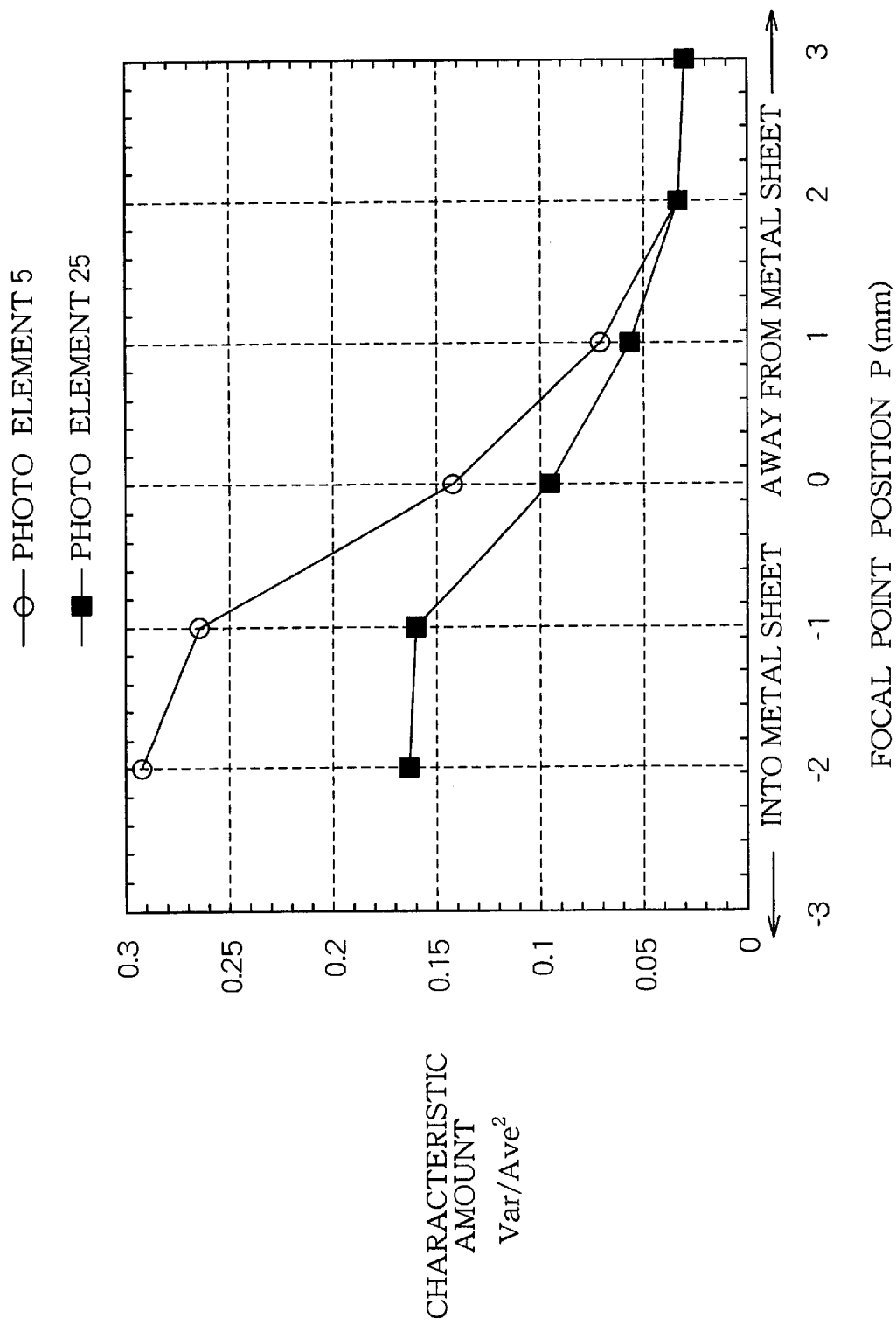
FIG. 10 shows a focal point table obtained by the example of the fourth embodiment of FIG. 9.

Description will now be directed to a specific example of the fourth embodiment with reference to FIG. 9 and FIG. 10.

As shown in FIG. 9, an aluminum plate 1 of JIS 5083 having a thickness of 2.5 mm was placed on another aluminum plate of JIS 5083 having a thickness of 2.5 mm. The photo element 5 was fixed at an angle of 13 degrees with respect to the surface of the first aluminum plate and the second photo element 25 was fixed at an angle of 61 degrees with their light receiving surfaces facing the welding position. In this arrangement, the first photo element 5 mainly receives light generated out of a keyhole, whereas the second photo element 25 receives both of the light generated inside the keyhole and out of the keyhole.

The welding laser 3 used was a carbon dioxide gas laser having an output 3 kW (feed speed 3 m/s, and filler supply speed 3 m/s). Welding caused a plasma light 4. The carbon dioxide gas laser 3 emits light from a nozzle (torch) which moves up and down together with the converging means. Welding was actually repeated and the nozzle tip end position when a maximum melting was obtained was determined to be a reference position of the laser focal point. In the state that the nozzle tip end was at the reference position, carbon dioxide gas laser 3 was actuated and a characteristic amount obtained from the first characteristic amount calculation means 12 was recorded, and a characteristic amount obtained from the second characteristic amount calculation means 12 was recorded.

Next, the nozzle position was successively shifted by 1 mm from the reference position. Each time the nozzle position was shifted, two characteristic amounts according to the first and the second photo elements 5, 25 were recorded. Here, the sampling rate was set to 20 kHz and the number of samples was set to 10000.

This resulted in the two relationships shown in FIG. 10. In this FIG. 10, the focal point P is negative (minus) when deviating inside the aluminum plates and positive (plus) when deviating outward. The relationships in the range from minus 2 mm to plus 3 mm having no change in sign were set in the focal point table 8. This FIG. 10 shows that the relationship between the characteristic amount and the focal point can be obtained independently of the fixed position of the photo element.

Figure 11:
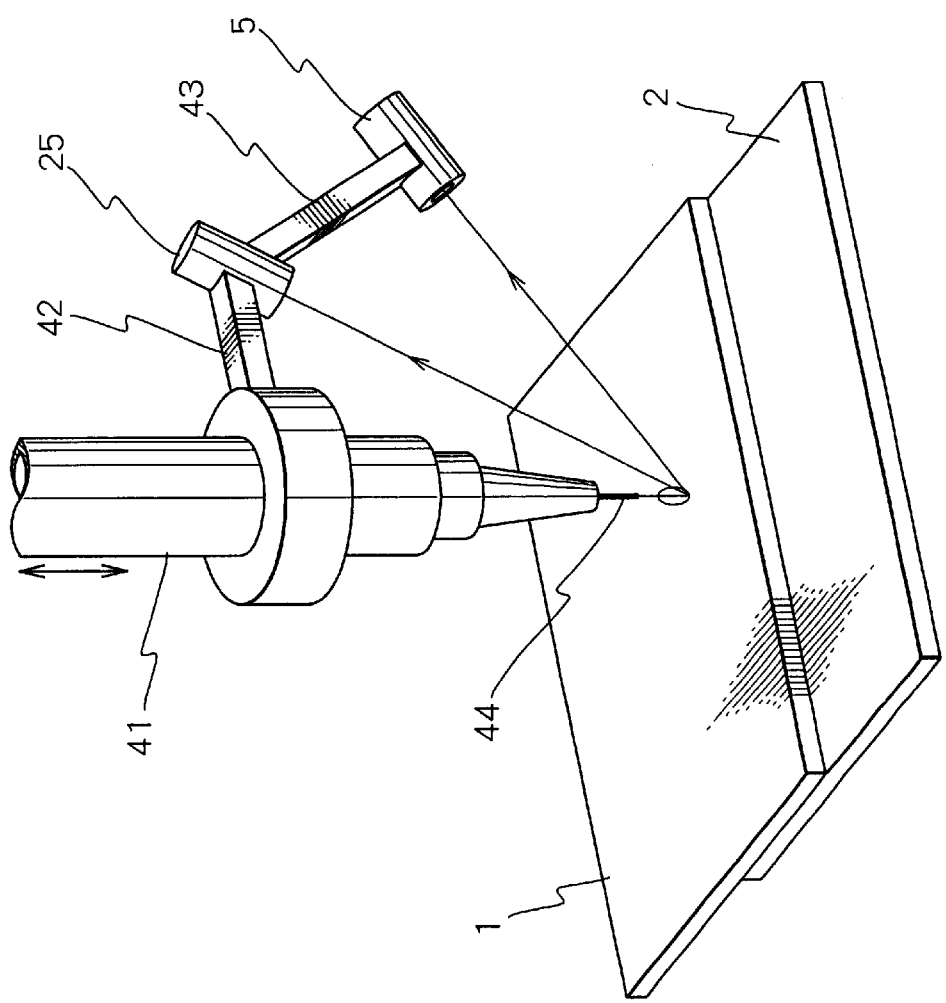
FIG. 11 is a perspective view wherein a photo-element is fixed in the fourth embodiment of FIG. 8.

Here, the two photo elements 5 and 25 may also be arranged as shown in FIG. 11. That is, a firs arm 42 extends from the side wall of the laser output means main body 41 and the second photo element 25 is fixed to the tip end of the arm 42. Furthermore, a second arm 43 extends from this second photo element 25, and the first photo element 5 is fixed to the tip end of the second arm 43. In this case, the photo elements 5 and 25 are moved according to the vertical movement of the laser output means main body 41.

With the aforementioned configuration, it has been assured that even by directly using the variance value as in the third embodiment, it is possible to obtain a focal point table (10) almost identical to that of the fourth embodiment. As a result, the relationship between the variance value and the focal point position can be obtained independently of the fixed position of the photo element. This configuration with a fixed position of the photo element can also be employed in the first embodiment.

In the fourth embodiment using a characteristic amount, it has been assured that the focal point table of FIG. 10 can also be obtained when the positioning of the two photo elements are performed by visual check.

It should be noted that the present invention is not to be limited to the aforementioned embodiments and examples. The metal to be welded may be other than the aluminum plate. That is, the present invention can be applied to other materials to be welded.

As for the reference position of a focal point may be other than the position having the maximum melting.

Moreover, the present invention can also be applied to a focal point positioning apparatus for controlling the position of the converging means by feeding back a focal point position information detected so that the focal point is always at an optimal position. In this case, the apparatus may include, in the latter stage of the focal point position calculation means, a control means for controlling the position of a laser converging means, so that a deviation amount of the focal point position obtained from the focal point position calculation means, from the reference point approaches zero.

Furthermore, considering that the laser focal point significantly affects the welding quality, it is possible to implement a welding quality justification apparatus for deciding the resultant welding as acceptable or unacceptable. In this case, there may be provided a quality justification means at the latter stage of the focal point position calculation means for comparing a focal point (deviation from a reference position) produced from the focal point position calculation means, to a predetermined threshold value. If the deviation exceeds the threshold value, the welding is decided to be unacceptable.

The present invention is based on the fact we found that in a predetermined interval, a focal point and a variance value of the light emitting intensity caused in a welding position is in a one-to-one correspondence. This correspondence is recorded in a focal point table so that the focal point table is used for determining a focal point position from the variance value. Consequently, it is possible to detect a welding laser focal point according to the output of the photo element. That is, even if a laser optical system or an oscillator has changed by age, which in turn fluctuates a distance between the laser converging means and the laser focal point, it is possible to correctly detect the focal point because the detection of the focal point is based only on the light intensity from the welding position.

Moreover, the variance value is divided by a square of the average value to obtain a characteristic amount. The correlation between the characteristic amount and the focal point position is recorded on the focal point table. When a focal point position is detected by referencing this table, it is possible to increase the valid range of the focal point table. This enables to detect focal point positions in a wider valid range.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. A10-170567 (Filed on Jun. $3^{rd}$, 1998) including specification, claims, drewings and summary are incorporated herein by reference in its entirety.

What is claimed is:

1. A welding laser focal point position detecting apparatus comprising:
   a photo element for receiving light from a position of welding performed by a laser beam source and converting the intensity of the received light into an electric signal;
   a sampler for sampling periodically the electric signal produced from the photo element, periodically with a predetermined interval;
   a calculator for calculating a variance value of discrete light intensity data when a predetermined number of light intensity data items have been stored and dividing the variance value by a square of an average value so as to obtain a characteristic amount; and
   a detector for detecting a distance from a reference focal point according to the variance calculated.

2. An apparatus as claimed in claim 1, the apparatus further comprising a focal point table containing relationships between focal points and variance values which have been detected around the reference focal point serving as the reference, and
   wherein the detector references the focal point table according to the variance values.

3. A welding laser focal point position detecting apparatus comprising:
   a photo element for receiving light from a position of welding performed by a laser beam source and converting the intensity of the received light into an electric signal;
   a sampler for sampling periodically the electric signal produced from the photo element, periodically with a predetermined interval;
   a calculator for calculating a variance value of discrete light intensity data items when a predetermined number of light intensity data items have been stored, the calculator further calculating a characteristic amount, wherein the characteristic amount is the variance value divided by a square of the average value; and
   a detector for detecting the focal point shifting from a focal point serving as a reference, according to the characteristic amount calculated.

4. An apparatus claimed in claim 3, further comprising a focal point table containing relationships between characteristic amounts and focal points around a characteristic amount measured beforehand at the aforementioned reference focal point, wherein the detector references the focal point table according to the size of the characteristic amount.

5. A welding laser focal point position detecting apparatus comprising:
   a photo element for receiving light from a position of welding performed by a laser beam source and converting the intensity of the received light into an electric signal;
   a sampling device for sampling periodically the electric signal produced from the photo element, periodically with a predetermined interval;
   a calculator configured to calculate a distribution of discrete light intensity data items and a characteristic amount comprising a variance value of the discrete light intensity data items divided by a square of an average light intensity value; and
   a detector for detecting the focal point shifting according to the distribution and characteristic amount calculated.

6. A welding laser focal point position detecting apparatus as claimed in claim 5, wherein if the sampled data items are distributed in a large range, the detector determines that the focal point position has moved away from the laser beam source, and if the sampled data items are distributed in a small range, the detector determines that the focal point position has advanced toward the laser beam source.

7. A welding laser focal point position detecting apparatus comprising:
   a photo element for receiving light from a position of welding performed by a laser beam source and converting the intensity of the received light into an electric signal;
   a sampler for sampling periodically the electric signal produced from the photo element, periodically with a predetermined interval;
   a calculator configured to calculate a distribution (or deviation from a reference value) and a characteristic amount of discrete light intensity data items when a predetermined number of light intensity data items have been stored; and
   a detector configured to detect the focal point shifting according to the distribution and characteristic amount calculated, wherein the characteristic amount comprises the distribution divided by a square of an average light intensity value.

* * * * *